July 2, 1940.  J. O'D. KIRWAN  2,206,845
APPARATUS FOR SUPPLYING GAS
Filed June 1, 1939
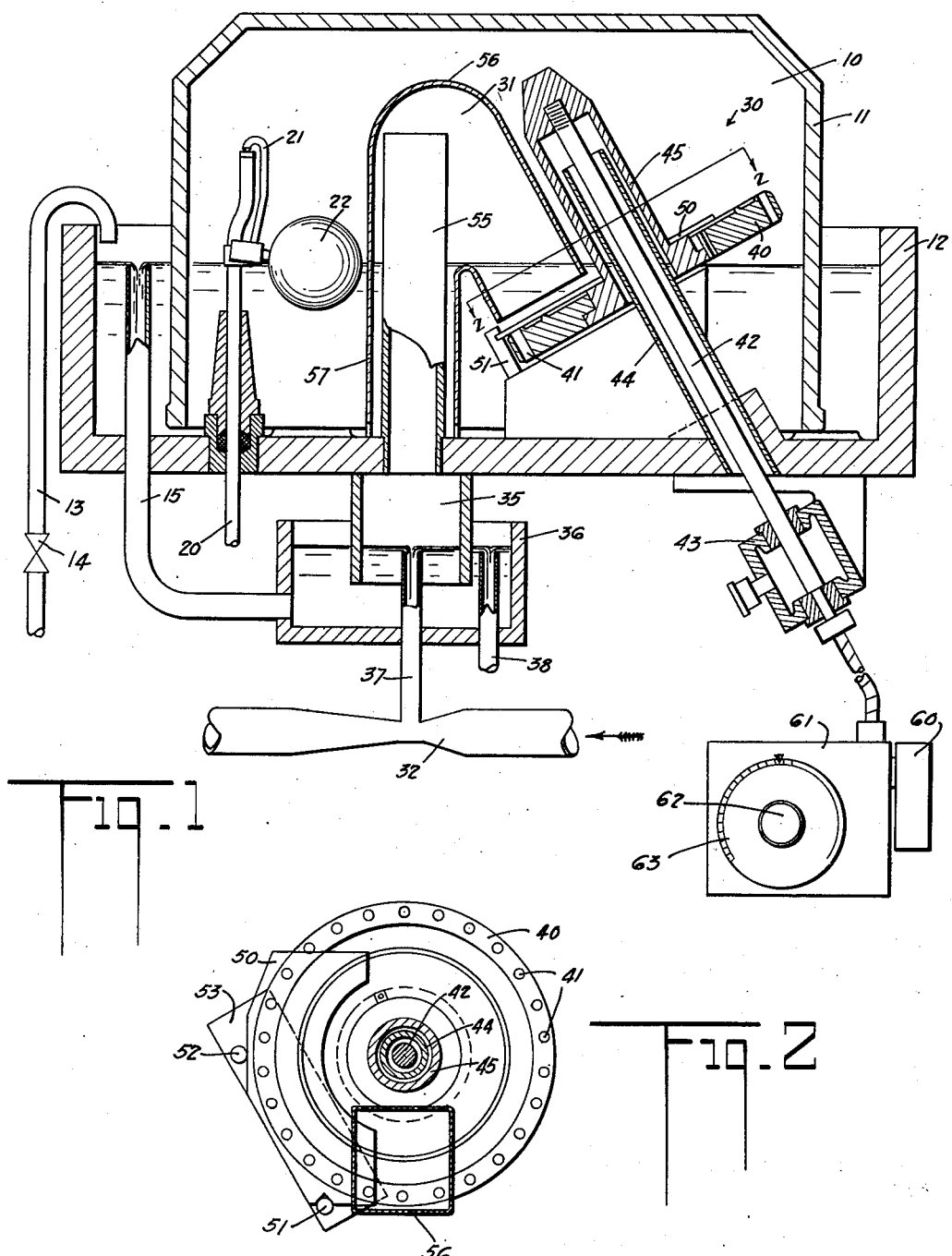
INVENTOR
John O'Donnell Kirwan
BY Arthur L. Kent
his ATTORNEY Patented July 2, 1940

2,206,845

UNITED STATES PATENT OFFICE 2,206,845

APPARATUS FOR SUPPLYING GAS

John O'Donnell Kirwan, Bloomfield, N. J., assignor to Wallace & Tiernan Company, Inc., Belleville, N. J., a corporation of New York Application June 1, 1939, Serial No. 276,827

7 Claims. (Cl. 210—28)

This invention relates to apparatus for supplying gas at a controlled rate, and the object of the invention is generally to provide an improved apparatus whereby the gas may be supplied accurately at any desired rate of flow within a comparatively great range and down to a very low rate.

The invention aims to provide an apparatus for practicing the method disclosed and claimed in the Wallace Patent No. 2,083,412, dated June 8, 1937, and which is an improvement on the apparatus of said patent. More particularly, the invention aims to provide an apparatus which is simpler and less costly to make and to service than the apparatus of said patent and which has other important advantages which will appear from the following description.

The invention has been made especially with the idea of providing an apparatus for supplying chlorine at accurately controlled low rates for treating very small water supplies. In treating water and watery liquids with chlorine, the chlorine is usually fed into a stream of the water to be treated. The amount of chlorine used is very small compared to the amount of water treated, and the rate of supply of the chlorine must be accurately controlled, and it is desirable that it be metered in order that the amount being supplied may be known.

According to the method of said Wallace patent, successive measured volumes of gas are moved at a controlled rate from a supply of the gas maintained at a substantially constant pressure and delivered to a receiving space from which the delivered gas is withdrawn at a rate controlled by the pressure in the receiving space to maintain such pressure substantially constant. As in the apparatus of said Wallace patent, I employ a driven feeding and metering device whereby separate volumes of the gas at a constant pressure are moved successively, at a rate which determines the rate of supply of the gas, from a constant pressure supply and delivered to a chamber or space from which the gas is then withdrawn at a rate controlled by the pressure in such chamber or space to maintain such pressure substantially constant, so that the rate at which the gas is so withdrawn is the rate at which the gas is moved by and discharged from the feeding and metering device, and the rate at which the feeding and metering device is operated determines the rate at which the gas is supplied by the apparatus.

In accordance with the present invention, the feeding and metering device by which the separate volumes of gas at constant pressure are moved and delivered is a driven member having a gas pocket which by movement of the member is moved, at intervals determined by the rate at which the member is driven, from a gas space in which gas is maintained at a constant pressure bodily down into a body of liquid, the gas pocket having two openings one of which is at a higher level than the other when the pocket moves down into the liquid, and means being provided for sealing the upper opening of the pocket as it moves down into the liquid and until it reaches a point beneath the submerged open lower end of a gas-receiving chamber from which the gas is drawn through a delivery passage. When the pocket is in the gas space it is filled with gas, and as it moves down into the liquid it carries this measured volume of gas which is prevented from escaping from the pocket until the pocket is beneath the open end of the gas-receiving chamber, whereupon the gas is released and rises from the pocket into the chamber. The driven member, rather than being a reciprocating or oscillating member, is most desirably a member having a plurality of the gas pockets and so formed and so mounted that the pockets are moved in an orbital path partly through the gas space and partly through the body of liquid, the pockets being spaced in the direction of their orbital movement.

In the form of apparatus which is now considered best, the feeding and metering device comprises a rotary disc carried by a shaft which extends upward at an angle to the vertical through the liquid and into the constant pressure gas space, which disc has a plurality of circumferentially spaced gas pockets formed by openings extending between and opening through the upper and lower faces of the disc, most desirably parallel to the axis of rotation of the disc, the disc being positioned so as to be partly submerged in the liquid and partly in the gas space above the liquid, and a plate resting on the upper face of the disc and providing a sealing surface for preventing escape of gas from the upper opening of the gas pockets extending from a point above the liquid in the direction of movement of the pockets to a point beneath the gas-receiving chamber. The parts of such an apparatus are of such simple form as to be readily made from materials highly resistant to corrosion such as are desirably used in apparatus of this kind and which are difficult to machine. And because of the simple form of parts of the apparatus, it has been found practical to make certain of them of clear glass and desirable to do so because it enables the operation of the apparatus to be observed.

Most desirably, the apparatus is designed to operate with the chlorine or other gas supplied to the feeding and metering device at or about atmospheric pressure, and is a so-called solution feed apparatus in which the gas delivered to the feeding and metering device is withdrawn by a suction device in the form of a water aspirator which may be operated by a minor stream of water into which the gas is drawn to be mixed with the minor stream and discharged therewith into the main stream of water to be treated, or, in treating a very small flow of water, the entire flow may be passed through the aspirator. The aspirator has a suction capacity in excess of that required to withdraw the gas as fast as delivered by the feeding and metering device, and this excess capacity is satisfied by make-up water supplied from a constant level supply the relation of which constant water level to the inlet opening through which the gas and make-up water pass to the aspirator determines the pressure maintained between the aspirator and the feeding and metering device. The rate of feed of the gas, which depends on the rate at which the feeding and metering device is driven, may be varied either manually or automatically. A dial and pointer may be provided to show the speed at which the feeding and metering device is driven, and from this the rate at which the gas is being supplied can be calculated, or the dial may be calibrated to show directly the rate of gas supplied in pounds of gas per day or otherwise as desired. Metering means separate from the gas feeding device may, of course, be provided.

A full understanding of the invention can best be given by a detailed description of an approved form of apparatus embodying the various features of the invention, and such a description will now be given in connection with the accompanying drawing illustrating such an apparatus designed especially for treating flowing water with chlorine.

In said drawing:

Fig. 1 is a sectional view, somewhat diagrammatic, of such an apparatus; and

Fig. 2 is a detail view looking downward on the feeding disc and partly in section on the line 2—2 of Fig. 1.

Referring to the drawing, 10 is a chamber formed by a bell jar 11 which stands open end down in an open tray 12, in which chamber when the apparatus is in operation a supply of chlorine gas is maintained under a substantially atmospheric pressure. Water is supplied to and maintained at a constant level in the tray 12 and the bell jar is supported in the tray so as to provide for the passage of water into the jar beneath its lower edge. As shown, the tray is fed from any suitable source of supply through a pipe 13 at a suitable rate controlled by a valve 14 and the water overflows through a pipe 15. The water level within the chamber 10 will depend on the gas pressure within the chamber, and when the gas pressure is equal to atmospheric pressure the water within the chamber will stand at the same level as in the tray outside the jar 11.

Chlorine gas is supplied to the chamber 10 from a suitable source of supply under pressure such as a tank of compressed liquefied chlorine. The gas flows into the chamber through a tube 20 which extends upward through a stuffing box to a point above the maximum water level in the chamber, and the supply of chlorine to the chamber is controlled by means of a valve 21 which seats in a valve seat at the upper end of the tube 20 and is operated by a ball float 22, which are or may be as more fully described in my Patents Nos. 1,514,938 and 1,777,966. When in the operation of the apparatus, gas is fed from the chamber and the pressure within the chamber is reduced below the desired pressure, the water will rise within the chamber and the float will be raised to open the valve 21, thus permitting the chlorine gas to enter the chamber. If the gas enters the chamber faster than it is fed from the chamber, the water level within the chamber is depressed, permitting the float to fall and close the valve. Equilibrium is thus established and chlorine gas is supplied to the chamber at the rate at which it is fed from the chamber, and a supply of gas will thus be maintained within the chamber at the desired pressure and the water will be maintained at the desired level. The gas pressure and water level maintained within the chamber will be determined by the elevation of the float and valve operating mechanism, which are most desirably set so as to maintain, as stated, substantially atmospheric pressure within the chamber, in which case the water level will be substantially the same as in the tray outside the chamber.

Gas is fed from chamber 10 by a motor driven feeding and metering device 30 by which a succession of separate measured volumes of gas are moved from the gas space within the chamber and delivered to a gas receiving chamber, or space, 31 from which the gas is withdrawn as fast as it is delivered by the feeding and metering device. As shown, and most desirably, the gas is thus withdrawn by means of a water aspirator 32 connected in a pipe 33 supplied with water from any suitable source of supply and which may discharge into the water to be treated as disclosed in said Wallace Patent 2,083,412, or when very small flows of water are to be treated, may carry the entire flow of such water. Any suitable means may be provided for controlling the flow of water through the aspirator and its consequent pulling capacity.

In order that the aspirator shall withdraw the gas at the rate at which it is delivered into the receiving chamber 31 by the feeding and metering device, the aspirator should operate with a capacity slightly greater than required for so withdrawing the gas, and means is provided for supplying water to satisfy the excess capacity of the aspirator and to limit the amount of gas withdrawn by the aspirator to the amount delivered by the feeding and metering device, so that the gas pressure between the feeding and metering device and the aspirator will be maintained substantially constant and substantially equal to the pressure within the gas supply chamber 10.

As shown, the gas passes from the receiving chamber 31 into a suction chamber 35 which is open at the bottom and extends down into the water in an open constant level tray 36 and from which the gas is withdrawn by the aspirator through a tube 37. Water will rise within the chamber 35 to a level determined by the gas pressure within the chamber, and the elevation within the chamber 35 of the upper or inlet opening of the tube 37 will determine the gas pressure which is maintained within the chamber. If the inlet opening of the tube is at the level of the water within the constant level tray, the pressure will be that of atmosphere. If it is above the water level of the tray, a sub-atmospheric, or negative, pressure will be maintained, and if it is below the water level of the tray a super-atmospheric pressure will be maintained. The suction of the aspirator reduces the pressure within the suction chamber until the water rises to the tube inlet. Thereupon water enters the tube inlet to satisfy the excess capacity of the aspirator. Most desirably, the inlet of the suction tube is located so as to maintain the pressure in the suction chamber and in the receiving chamber 31 substantially the same as the pressure in the supply chamber 10. When atmospheric pressure is maintained in chamber 10, therefore, the inlet opening of the suction tube will be at the level of the water in the tray.

The water level within the suction chamber is thus controlled according to the pressure within the chamber and more or less water passes through the tube 37 to the aspirator as the gas pressure in the chamber is slightly less or more, more water and less gas being withdrawn if the pressure in the chamber drops slightly, and less water and more gas being withdrawn if the pressure in the gas rises slightly. The rate at which the gas is withdrawn by the aspirator is thus controlled by the pressure in the suction chamber, and is so controlled as to maintain the pressure in the suction chamber and in the gas-receiving chamber substantially constant. The aspirator thus withdraws the gas at the rate at which it is delivered by the feeding and metering devices, and mixes it with the water flowing through the pipe 33. The rate at which the gas is supplied to the water flowing through the pipe 33 may thus be varied by varying the rate at which the feeding and metering device is driven, and will vary proportionately to variations in the rate at which the feeding and metering device is driven.

The feeding and metering device 30 in the approved form shown comprises a driven rotary member 40 in the form of a disc of suitable size and thickness mounted within the chamber 10 with its axis inclined to the vertical and partly submerged in the water, and which has a plurality of circumferentially spaced straight openings 41 extending parallel to the axis between and opening through the upper and lower faces of the discs in a circle adjacent the periphery of the disc. These openings 41 serve as gas pockets into which the gas enters as they move through the gas space and from which the gas is prevented from escaping as the pockets move down into the water and until they reach a point beneath the submerged bottom opening into the gas-receiving chamber 31, whereupon as each pocket comes to this point its contained measured volume of gas rises through the overlying water into the chamber 31. The disc is mounted on a driving shaft 42 which extends from bearings 43 hung beneath the tray 12 through an opening in the bottom of the tray. Escape of water through the shaft opening in the tray bottom is prevented by an open ended tube 44 sealed into the opening and extending upward within the chamber with its open upper end above the maximum water level, through and beyond the upper end of which tube the shaft extends. The disc is mounted on the upper end of the shaft by means of a tubular hub 45 which is closed at its upper end and has its lower end below the water level so that it serves to prevent escape of gas through tube 44.

The gas which enters the pockets 41 as they move through the gas space within the chamber 10 is prevented from escaping from the pockets as they move down into the water by means of a plate 50 which rests on the upper face of the disc and provides a sealing surface for preventing escape of gas from the upper openings of the pockets, that is, from the upper ends of the through openings which form the pockets. This plate 50 is of a size and shape to provide such sealing surface extending in the direction of movement of the pockets from a point above the liquid to a point beneath the open bottom of the gas-receiving chamber 31, and the plate rests by gravity on the disc and is held in position by pins 51 and 52 which prevent any rotary or other movement parallel to the plane of the face of the disc while leaving the plate free to set flat against the face of the disc. As the wet face of the disc moves beneath the plate, a film of water is carried between the plate and the engaging surface or surfaces of the disc, effectively sealing the pocket openings. The plate positioning pins 46 and 47 extend from a standard 53 which rises from the bottom of the tray 12.

The suction chamber 35 in the apparatus shown is formed by an open-ended cylinder secured to the under side of the bottom of the tray 12, and connection from the gas-receiving chamber 31 to the suction chamber is made by an open-ended tube 55, the lower end of which is sealed in an opening in the tray bottom and which extends upward to a point within the receiving chamber 31 above the maximum water level in chamber 10. Chamber 31 is formed by a casing 56 having a neck 57 which extends down about the tube 55 and by which the casing is supported. The casing has a gas-receiving opening beneath the water level in the chamber 10 over a submerged portion of the disc 40 so as to receive the gas which rises from the pockets 41 as they move beyond the end of plate 50.

The number and size of the gas pockets 41 determines the feeding capacity of the disc. To change the feeding capacity of the apparatus it is only necessary to change the disc for one having gas pockets of a different size or having a different number of pockets, or both. For convenience in making this change, and to avoid having to change the whole disc structure, the disc is more desirably, and as shown, made up of two parts, a shouldered hub portion and an annular outer portion which seats on the hub portion to be supported and driven thereby but which may be removed by simply lifting it off from the hub portion.

To change the capacity of the apparatus it is only necessary, therefore, to lift off the bell jar 11 and then remove the casing 56 and the plate 50, whereupon the annular outer portion of the disc may be removed and a different one placed in position on the shouldered portion of the hub, the plate 50, casing 56 and bell jar 11 being then replaced. The supply of gas through the tube 20 should, of course, be shut off before the bell jar is removed, and the capacity of the aspirator must, as stated, always be slightly in excess of that required to draw away the maximum amount of gas which will be fed by the disc 40.

The disc 40 may be driven by any suitable means which will provide a constant speed of rotation with the necessary speed adjustment. Very little power is required to drive the disc. As shown, a small motor, indicated at 60, which may be a constant speed electric motor or other suitable constant speed motor, drives the shaft 42 through a speed-varying device indicated at 61 having a control knob 62 with which is associated a dial 63 which may be calibrated in pounds of chlorine per 24 hours or otherwise as desired.

The various parts of the apparatus with which yet chlorine comes in contact must, of course, be made of suitable chlorine resistant material. as usual in apparatus of this kind. It has been found advantageous to make the plate 50 and the gas-receiving chamber casing 56 of clear glass so that the movement of the successive volumes of gas from the disc pockets into the receiving chamber may be readily observed.

As with the apparatus of said Wallace Patent 2,083,412, the new feeding and metering device lends itself readily to combination with automatic control means whereby the rate of supply of chlorine may be automatically varied according to the rate of flow of water being treated, it being only necessary to provide means for driving the feeding and metering disc at a rate which varies directly in proportion to variations in the quantity of water flowing, and this may be accomplished, for example, in the manner illustrated in said Wallace patent.

The new feeding and metering device, in addition to its comparative simplicity and low production cost, has, in addition to the advantages hereinbefore referred to, the advantage that its rate of feed is not affected by such small changes in water level as do not otherwise affect the operation of the apparatus. Also, the shaft bearings being outside the chamber 10, they are adapted for conventional lubrication and are not subjected to the corrosive atmosphere. Maintenance cost is very low, such infrequent servicing as is required being very simple.

What is claimed is:

1. Apparatus for supplying gas by moving successive measured volumes of the gas at a controlled rate from a supply of the gas maintained at a substantially constant pressure and delivering them at a controlled rate to a receiving space and withdrawing the gas so delivered at a rate controlled by the pressure of the delivered gas to maintain such pressure substantially constant, which comprises a gas supply chamber containing a constant level body of liquid and in which gas is maintained at a substantially constant pressure, a driven feeding member mounted within said chamber having a gas pocket which is moved, at intervals determined by the rate at which said member is driven, from the gas space down into the liquid within the chamber, said gas pocket having two openings one of which is at a higher level than the other when the pocket moves down into the liquid, a gas-receiving chamber extending down into the liquid in the gas supply chamber and having a gas-receiving opening above a submerged part of the path of movement of the gas pocket, means for preventing escape of gas from the upper opening of the gas pocket as the pocket moves down into the liquid and until it reaches a point beneath the gas-receiving opening of the gas-receiving chamber, and means providing a delivery passage from the gas-receiving chamber.

2. Apparatus for supplying gas by moving successive measured volumes of the gas at a controlled rate from a supply of the gas maintained at a substantially constant pressure and delivering them at a controlled rate to a receiving space and withdrawing the gas so delivered at a rate controlled by the pressure of the delivered gas to maintain such pressure substantially constant, which comprises a gas supply chamber containing a constant level body of liquid and in which gas is maintained at a substantially constant pressure, a driven feeding member mounted within said chamber having a plurality of gas pockets which are moved in an orbital path partly through the gas and partly through the liquid within the chamber, said pockets being spaced in the direction of their movement and each having two openings one of which is at a higher level than the other, a gas receiving chamber extending down into the liquid in the gas supply chamber and having a gas receiving opening above a submerged part of the path of movement of the gas pockets, means for preventing escape of gas from the upper opening of the gas pockets as they move down into the liquid and until they reach a point beneath the gas receiving opening of the gas receiving chamber, and means providing a delivery passage from the gas receiving chamber.

3. Apparatus for supplying gas by moving successive measured volumes of the gas at a controlled rate from a supply of the gas maintained at a substantially constant pressure and delivering them at a controlled rate to a receiving space and withdrawing the gas so delivered at a rate controlled by the pressure of the delivered gas to maintain such pressure substantially constant, which comprises a gas supply chamber containing a constant level body of liquid and in which gas is maintained at a substantially constant pressure, a driven rotary feeding member mounted within said chamber with its axis inclined from the vertical and having a plurality of gas pockets spaced circumferentially about the axis of rotation in a plane normal to the axis and each having two openings one of which is at a higher level than the other, said member being positioned to be partly submerged in the liquid, whereby the gas pockets are moved in a circular path partly through the gas and partly through the liquid within the chamber, a gas receiving chamber extending down into the liquid in the gas supply chamber and having a gas receiving opening above a submerged part of the path of movement of the gas pockets, means for preventing escape of gas from the upper opening of the gas pockets as they move down into the liquid and until they reach a point beneath the gas receiving opening of the gas receiving chamber, and means providing a delivery passage from the gas receiving chamber.

4. Apparatus for supplying gas by moving successive measured volumes of the gas at a controlled rate from a supply of the gas maintained at a substantially constant pressure and delivering them at a controlled rate to a receiving space and withdrawing the gas so delivered at a rate controlled by the pressure of the delivered gas to maintain such pressure substantially constant, which comprises a gas supply chamber containing a constant level body of liquid and in which gas is maintained at a substantially constant pressure, a driven rotary feeding member mounted within said chamber with its axis inclined from the vertical and having a plurality of gas pockets spaced circumferentially about the axis of rotation in a plane normal to the axis and each having two openings one of which is at a higher level than the other, said member being positioned to be partly submerged in the liquid, whereby the gas pockets are moved in a circular path partly through the gas and partly through the liquid within the chamber, a gas receiving chamber extending down into the liquid in the gas supply chamber and having a gas receiving opening above a submerged part of the path of movement of the gas pockets, means providing a sealing surface for preventing escape of gas from the upper openings of the gas pockets extending from a point above the liquid in the direction of movement of the pockets to a point beneath the gas receiving opening of the gas receiving chamber, and means providing a delivery passage from the gas receiving chamber.

5. Apparatus for supplying gas by moving successive measured volumes of the gas at a controlled rate from a supply of the gas maintained at a substantially constant pressure and delivering them at a controlled rate to a receiving space and withdrawing the gas so delivered at a rate controlled by the pressure of the delivered gas to maintain such pressure substantially constant, which comprises a gas supply chamber containing a constant level body of liquid and in which gas is maintained at a substantially constant pressure, a driven rotary disc mounted within said chamber with its axis inclined to the vertical and partly submerged in the liquid in the chamber, said disc having a plurality of circumferentially spaced gas pockets formed by openings extending between and opening through the upper and lower faces of the discs, a gas receiving chamber extending down into the liquid in the gas supply chamber and having a gas receiving opening above a submerged part of the disc, a plate resting on the upper face of said disc and providing a sealing surface for preventing escape of gas from the upper opening of the gas pockets extending from a point above the liquid in the direction of movement of the pockets to a point beneath the gas receiving opening of the gas receiving chamber, and means providing a delivery passage from the gas receiving chamber.

6. Apparatus for supplying gas by moving successive measured volumes of the gas at a controlled rate from a supply of the gas maintained at a substantially constant pressure and delivering them at a controlled rate to a receiving space and withdrawing the gas so delivered at a rate controlled by the pressure of the delivered gas to maintain such pressure substantially constant, which comprises a gas supply chamber containing a constant level body of liquid and in which gas is maintained at a substantially constant pressure, a driven rotary disc mounted within said chamber with its axis inclined to the vertical and partly submerged in the liquid in the chamber, said disc having a plurality of circumferentially spaced gas pockets formed by openings extending parallel to the axis between and opening through the upper and lower faces of the discs, a gas receiving chamber extending down into the liquid in the gas supply chamber and having a gas receiving opening above a submerged part of the disc, a plate resting on the upper face of said disc and providing a sealing surface for preventing escape of gas from the upper opening of the gas pockets extending from a point above the liquid in the direction of movement of the pockets to a point beneath the gas receiving opening of the gas receiving chamber, and means providing a delivery passage from the gas receiving chamber.

7. Apparatus for supplying gas by moving successive measured volumes of the gas at a controlled rate from a supply of the gas maintained at a substantially constant pressure and delivering them at a controlled rate to a receiving space and withdrawing the gas so delivered at a rate controlled by the pressure of the delivered gas to maintain such pressure substantially constant, which comprises a gas supply chamber containing a constant level body of liquid and in which gas is maintained at a substantially constant pressure, a tube sealed in an opening in the bottom wall of said chamber and extending at an angle to the vertical upward through the liquid to a point above the liquid level, a motor driven shaft extending through said tube, a disc mounted on said shaft by means of a hollow tubular hub portion extending upward about the tube and connected to the upper end of the shaft, said disc being partly submerged in the liquid and having a plurality of circumferentially spaced gas pockets formed by openings extending between and opening through the upper and lower faces of the disc, a gas receiving chamber extending down into the liquid in the gas supply chamber and having a gas receiving opening above a submerged part of the disc, a plate resting on the upper face of said disc and providing a sealing surface for preventing escape of gas from the upper opening of the gas pockets extending from a point above the liquid in the direction of movement of the pocket to a point beneath the gas receiving opening of the gas receiving chamber, and means providing a delivery passage from the gas receiving chamber.

JOHN O'DONNELL KIRWAN.

CERTIFICATE OF CORRECTION.

Patent No. 2,206,845.                                    July 2, 1940.

JOHN O'DONNELL KIRWAN.

It is hereby certified that error appears in the printed specification of the above numbered patent requiring correction as follows: Page 2, second column, line 5, for the patent number "1,514,938" read --1,514,939--; page 3, second column, line 15, for the word "set" read --seat--; page 4, first column, line 5, for "yet" read --wet--; line 6, strike out the period after "material" and insert instead a comma; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.